Nov. 12, 1963   E. S. HEGEDIC ETAL   3,110,423
TOPPING DISPENSER
Filed Aug. 9, 1960
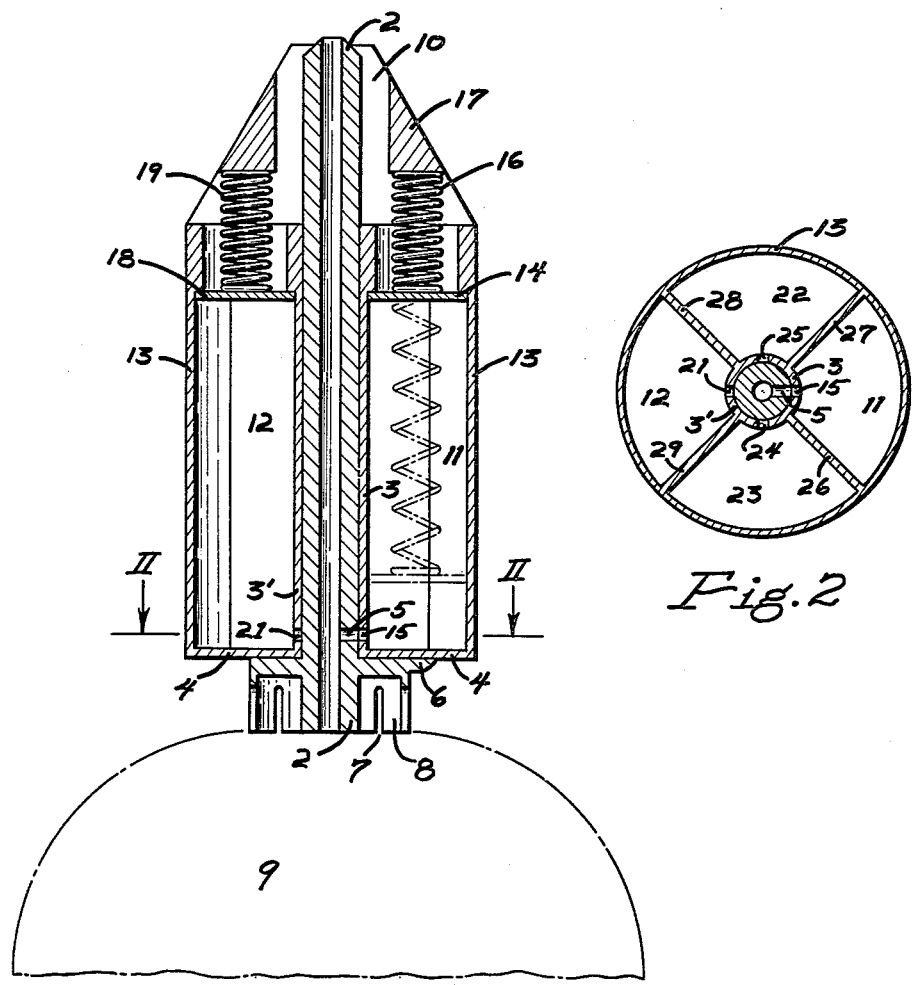
INVENTOR.
ELLIOTT S. HEGEDIC
BY NORMAN SHORR
William L. Krayer
THEIR ATTORNEY

United States Patent Office 3,110,423
Patented Nov. 12, 1963

3,110,423
TOPPING DISPENSER
Elliott S. Hegedic, Marshall Township, Allegheny County, and Norman Shorr, Mount Lebanon Township, Allegheny County, Pa. (both of R. D. 1, Mars, Pa.)
Filed Aug. 9, 1960, Ser. No. 48,540
6 Claims. (Cl. 222—135)

This invention relates to means for dispensing colored or flavored topping, whipped cream or the like. This application is a continuation-in-part of our copending application Serial No. 837,846, filed September 3, 1959, now abandoned and the benefit of the earlier application date is claimed for the subject matter disclosed therein.

Prior to the present invention there had not been made a device for intimately mixing one of several flavors or coloring material with topping, whipped cream or the like while it is being ejected from a pressurized container. Our invention provides in a single convenient unit several different coloring or flavoring substances which may be mixed with the topping at will.

We have invented a device which is adapted to be attached to the nozzle of a standard commercial or domestic pressurized whipped cream dispenser. It enables the operator to flavor or color the whipped cream with one of several flavors or colors. A change of color or flavor can be accomplished merely by turning a knob or dial or by turning the body of the dispenser in relation to an indicator or dial. Briefly, our invention includes a body having one or more chambers surrounding a tube member which may be rotated on its longitudinal axis with respect to the body of the device. The tube and/or the body are adapted to be connected to the nozzle end of a standard whipped cream or topping dispenser in such a way that topping leaving its pressurized container will immediately enter the tube member. The tube member is provided with a lateral orifice, preferably near the base end of the tube, in a position which will permit easy alignment with a corresponding orifice in each of the chamber walls. Each chamber is filled with coloring or flavoring material and is equipped with means for providing pressure. A presently preferred embodiment of our invention is depicted in FIGURES 1 and 2.

FIG. 1 is a sectioned side elevational view of the preferred form.

FIG. 2 is a cross section of our invention taken at the point where the orifices of the chambers communicate with the orifice of the tube.

Referring now to FIG. 1, tube 2 fits in a shaft formed by walls 3 and 3' which terminate at the lower end at housing base 4. Tube 2 is provided with an orifice 5 and an indicator 6. The lower end of tube 2 contains cylindrical slot 7 which is capable of receiving the nozzle 8 of a pressurized whipped cream dispenser 9. Preferably the upper end of tube 2 protrudes from housing cover 10. Chamber 11 is defined by wall 3, housing base 4, housing 13, and plunger 14. Orifice 15 extends through wall 3 coincident with orifice 5 of tube 2. Plunger 14 is urged downward by compressed spring 16 which is anchored in block 17 of housing cover 10. Similarly, plunger 18 in chamber 12 is urged downward by compressed spring 19. Chamber 12 is also equipped with an orifice 21 at the level of orifice 5 of tube 2.

In FIG. 2, a section taken at point II shows tube orifice 5 in communication with orifice 15 in wall 3 of chamber 11. Also illustrated are orifices 25, 21, and 24 of chambers 22, 12 and 23 respectively. Housing 13 defines the outer walls of the chambers, while dividers 26, 27, 28 and 29 separate them.

Operation of the invention is as follows. The operator first attaches the dispenser to a pressurized or other whipped cream dispenser in the manner shown or in any manner which will provide a good flow of topping through tube 2. Indicator 6 is then set to the desired color or flavor preferably with reference to markings or other suitable indicia on the outside of housing base 4, thus causing communication between tube orifice 5 and the desired chamber. Spring 16 then causes plunger 14 to move downward forcing the coloring or flavoring agent into the tube. When the whipped cream dispenser is operated, the coloring or flavoring agent will be evenly mixed with it. The agent will be better dispersed in the whipped cream if it is injected into the tube near the base of the tube as shown rather than near the upper end of the chamber.

Spring 16 may, of course, be replaced by any device capable of generating a pressure in the chamber and forcing the coloring or flavoring agent into the tube.

Any means for attaching the tube to the whipped cream dispenser will be satisfactory so long as there is an unobstructed flow of whipped cream. Obviously, any means for indicating the position of the tube orifice with respect to the chamber orifices will serve the purpose. For example, the indicator could as well be at the upper end of tube 2. When the invention is attached to a relatively large source of topping, adjustment of the setting will be easier to accomplish by turning the body of the invention rather than the tube.

Having thus described and illustrated a presently preferred embodiment of our invention, it is to be distinctly understood that it is not limited thereto but may be otherwise variously embodied and constructed within the scope of the following claims.

We claim:

1. A dispenser for coloring agents, flavoring agents, and the like for use with a pressurized container of whipped cream, topping, or the like to selectively mix said agents therewith comprising a tube member having an inlet port, a terminal outlet port, and a lateral orifice, a housing having means for receiving said tube member adapted to permit said tube member to be rotated relative to the housing, said housing defining a plurality of chambers each having an orifice aligned with the circle described by the revolution of the lateral orifice of said tube member, and means for attaching the inlet port of said tube member to a pressurized source of topping, whereby when the tube orifice and a chamber orifice communicate, and topping is passed through said tube member, material in the communicating chamber will pass into said tube member and mix with the topping.

2. A dispenser for coloring agents, flavoring agents, and the like for use with a pressurized container of whipped cream, topping, or the like to selectively mix said agents therewith comprising: a tube member having a lateral orifice; a housing defining a plurality of chambers and having means for receiving said tube member adapted to permit said tube member to be axially rotated relative to the housing, each of said chambers having an orifice disposed to communicate with said lateral orifice of said tube member when said tube member is relatively rotated to the desired position, and means for attaching the inlet end of said tube member to a source of topping.

3. A dispenser for coloring agents, flavoring agents, and the like for use with a pressurized container of whipped cream, topping, or the like to selectively mix said agents therewith comprising: a tube member having a lateral orifice; a housing having means for receiving said tube member and defining a plurality of chambers, each chamber having a lateral orifice in a position capable of communicating with the lateral orifice of said tube member on movement thereof with relation to said housing; a plunger in each chamber; and means for actuating said plunger to apply pressure to the contents of its chamber.

4. The dispenser of claim 3 including means for attaching said tube member to a pressurized source of whipped cream.

5. A dispenser for coloring agents, flavoring agents, and the like for use with a pressurized container of whipped cream, topping, or the like to selectively mix said agents therewith comprising (a) a tube member having an inlet port adapted to be attached to a pressurized source of whipped cream, topping, or the like, an outlet port, and at least one lateral orifice, and (b) a housing having means for receiving said tube member, said means for receiving said tube member being adapted to permit said tube member to be rotated relative to said housing, said housing defining a plurality of chambers, each chamber having an outlet in a position capable of communicating with a lateral orifice of said tube member by rotation of said tube member in relation to said housing.

6. The dispenser of claim 5 including means for applying pressure to the contents of each chamber to force it out of the chambers and into said tube member when communication therebetween is established.

References Cited in the file of this patent

UNITED STATES PATENTS

| 2,607,627 | Gregg et al. | Aug. 19, 1952 |
| 2,876,935 | Lindberg | Mar. 10, 1959 |
| 2,925,939 | Spero | Feb. 23, 1960 |

FOREIGN PATENTS

| 273,798 | Italy | May 2, 1930 |
| 958,376 | France | Sept. 12, 1949 |